(12) United States Patent
Cheng et al.

(10) Patent No.: US 7,484,202 B2
(45) Date of Patent: Jan. 27, 2009

(54) METHOD, SYSTEM AND PROGRAM PRODUCT FOR RETROFITTING COLLABORATIVE COMPONENTS INTO EXISTING SOFTWARE APPLICATIONS

(75) Inventors: Li-Te Cheng, Malden, MA (US);
Susanne Hupfer, Lexington, MA (US);
John F. Patterson, Carlisle, MA (US);
Steven L. Rohall, Winchester, MA (US);
Steven I. Ross, South Hamilton, MA (US)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 10/962,648

(22) Filed: Oct. 12, 2004

(65) Prior Publication Data

US 2006/0080640 A1    Apr. 13, 2006

(51) Int. Cl.
*G06F 9/44* (2006.01)
(52) U.S. Cl. .................................. 717/120; 717/162
(58) Field of Classification Search ................. None
See application file for complete search history.

(56) References Cited

U.S. PATENT DOCUMENTS

| | | | | |
|---|---|---|---|---|
| 6,748,555 | B1 * | 6/2004 | Teegan et al. ........... | 714/38 |
| 7,240,244 | B2 * | 7/2007 | Teegan et al. ........... | 714/38 |
| 7,243,271 | B2 * | 7/2007 | Teegan et al. ........... | 714/47 |
| 2005/0044197 | A1 * | 2/2005 | Lai ....................... | 709/223 |
| 2005/0057584 | A1 * | 3/2005 | Gruen et al. ............ | 345/752 |
| 2005/0138566 | A1 * | 6/2005 | Muller et al. ........... | 715/759 |
| 2008/0141335 | A1 * | 6/2008 | Thomas .................. | 726/1 |

OTHER PUBLICATIONS

Benny Van Aerschot, "Dynamic Aspect Oriented Programming in .Net", Jul. 2004, Lore, U. of Antwerp, Belgium, pp. 1-50.*
Panahi et al., "Adaptive Techniques for Minimizing Middleware Memory Footprint for Distributed, Real-Time, Embedded Systems", Oct. 2003, IEEE, pp. 54-58.*
Burke et al., Aspect-Oriented Programming and JBoss, May 2003, O'Reily OnJava.com, pp. 1-10 <http>//www.onjava.com/lpt/a3878?.*
Yan Chen, "Aspect-Oriented Programming (AOP): Dynamic Weaving for C++", Aug. 2003, Vrije Universiteit Brussel—Belgium.*
Cheng et al., "Retrofitting Collaboration into UIs with Aspects", Nov. 6, 2004, ACM, pp. 25-28.*
Hupfer et al., "Introducing Collaboration into an Application Development Environment", Nov. 6, 2004, ACM, pp. 21-24.*

* cited by examiner

*Primary Examiner*—Eric B Kiss
*Assistant Examiner*—Ben C Wang
(74) *Attorney, Agent, or Firm*—Dan McLoughlin; Hoffman Warnick LLC

(57) ABSTRACT

Under the present invention, an executable object such as binary or JAVA byte code corresponding to the software application is obtained. Based on an analysis of the software application, points for introducing the collaborative components are identified. A set of executable code (e.g., an Aspect) to introduce the collaborative components at the identified points is then defined and built. Thereafter, the set of executable code and the collaborative components are linked to the executable object.

23 Claims, 3 Drawing Sheets

FIG. 2

| Address Book - test.adr | | | | | |
|---|---|---|---|---|---|
| File Edit Search Help | | | | | |
| Last Name | First Name | Business Phone | Home Phone | Email | Fax |
| Cheng | Lie-Te | ext 1234 | 709-123-4567 | lie_cheng@us.ibm.com | 617-345-2345 |
| Dugmore | Sandra | | 514-123-4567 | sdugmore@barcenlona.marimac.ca | |
| Feinberg | Jonathan | ext 3456 | | jdf@us.ibm.com | |
| Geyer | Werner | ext 7890 | | wgeyer@us.ibm.com | 617-321-0000 |
| Greif | Irene | ext 0001 | | igreif@us.ibm.com | 617-987-6543 |
| Millen | David | ext 0007 | | david_r_millen@us.ibm.com | |
| Wattenberg | Martin | ext 2345 | | mwatten@us.ibm.com | |

METHOD, SYSTEM AND PROGRAM PRODUCT FOR RETROFITTING COLLABORATIVE COMPONENTS INTO EXISTING SOFTWARE APPLICATIONS

BACKGROUND OF THE INVENTION

1. Field of the Invention

The present invention generally relates to a method, system and program product for retrofitting collaborative components into existing software applications.

2. Related Art

It is often desirable to introduce collaborative features, such as instant-messaging and email, into the user interface of software applications (e.g., "contextual collaboration" is an approach that embeds new collaborative capabilities into familiar non-collaborative applications). Unfortunately, some applications are not amenable to revision or reconstruction. Retrofitting collaborative features into legacy systems, in-house/custom-built software, and mission-critical applications using conventional approaches may be too expensive, time-consuming, and risky to be worthwhile. Ideally, the retrofitting process should have as little impact on the application as possible, yet it must incorporate the desired set of collaborative features.

To date, retrofitting has occurred at three levels—the application level, the programming environment level, and the operating system level. Each level has its own set of options, strengths, weaknesses, and Computer Supported Cooperative Work (CSCW)-related examples for the application developer to consider. Retrofitting at the application level enables the developer to leverage any extensibility offered by the application's architecture. The chief benefit is that any collaborative features that are introduced will exist gracefully within the application. Ideally, the framework for extension would focus on the application-specific issues and insulate the developer from peripheral and low-level details of the operating environment around the application.

Examples include using application programming interfaces intended for third-parties to introduce new components, or creating a proxy service to intercept and change the standardized protocols for communication and presentation supported by the application (e.g. SmartPrinter, a registered trademark, uses a proxy leveraging the printing protocol used by all applications in their workplace to insert awareness information on printouts). However, the original architects of the applications cannot be expected to foresee every future contingency, and the available application programming interfaces and standard protocols may be limited or nonexistent.

Retrofitting can also be considered at the programming environment level: one may be able to exploit the runtime characteristics of the environment used to create the application—particularly the dynamic capabilities of the language for the component responsible for the user interface. Some programming language environments are flexible, and offer options for programs to modify themselves at runtime and dynamically load new modules, without requiring recompilation. The main benefit here is the potential to significantly customize the behavior of the application beyond the original design of the application. Other environments offer some flexibility in manipulating the language's runtime libraries for user interfaces and event handling, without rebuilding the entire application. For example, through a custom class loader, Flexible Java Mail Manager (JAMM) does runtime replacement of Java's single-user interface components with collaborative equivalents.

A problem with this approach is that not all programming environments have the needed flexibility. The application being retrofitted may be coded in a restrictive environment, and have requirements for strict control over runtime configuration that may deny modification access to certain runtime libraries. Also, if well-defined APIs are not available, it may be difficult to customize or introduce new behaviors into the application. For example, while it might be easy to replace the default label widget with a new one by replacing the widget library at runtime, specifying that only one particular label use the customized label might not be possible with this technique.

Another level to consider for retrofitting involves interfacing with the operating system to trap event calls, capture pixels on the screen, and hook into the boundary between the application and the operating system's services. This option essentially treats the application like a "black box." However, there are a number of drawbacks to the operating system level approach. While the application becomes a "black box," the developer must now focus on the intricacies of the operating system. The deep semantics and data structures of the application are also obscured; only events and visible elements of the user interface are discernable at the operating system level. Moreover, there may be interference from events and side-effects from other applications and services running in the operating system. Thus, intelligent analysis of these discernable events may be required for seemingly simple application operations. Each of these levels highlights a diverse array of examples and suggests desirable characteristics to help retrofitting.

In view of the foregoing, there exists a need for a method system and program product for retrofitting collaborative components into existing software applications. Specifically, a need exists for a system that can retrofit collaborative components into existing software applications without having to edit or change the original source code.

SUMMARY OF THE INVENTION

In general, the present invention provides an aspect-oriented method system and program product for retrofitting collaborative components into an existing software application. Specifically, under the present invention, an executable object such as binary or JAVA (a registered trademark of Sun Microsystems in the U.S. and elsewhere) byte code corresponding to the software application is obtained. Based on an analysis of the software application, points for introducing the collaborative components are identified. A set of executable code (e.g., an Aspect) to introduce the collaborative components at the identified points is then defined and built. Thereafter, the set of executable code and the collaborative components are linked to the executable object.

A first aspect of the present invention provides a method for retrofitting collaborative components into an existing software application, comprising: receiving an executable object corresponding to the existing software application; analyzing the existing software application to identify points for introducing the collaborative components; defining a set of executable code to introduce the collaborative components at the identified points, wherein the set of executable code specifies when the collaborative components will be invoked and captures information used by the collaborative components from the existing software application; building the set of executable code; and linking the set of executable code and the collaborative components to the executable object.

A second aspect of the present invention provides a system for retrofitting collaborative components into an existing software application, comprising: means for receiving an executable object corresponding to the existing software application; means for analyzing the existing software application to identify points for introducing the collaborative components; means for defining a set of executable code to introduce the collaborative components at the identified points, wherein the set of executable code specifies when the collaborative components will be invoked and captures information used by the collaborative components from the existing software application; means for building the set of executable code; and means for linking the set of executable code and the collaborative components to the executable object.

A third aspect of the present invention provides a program product stored on a recordable medium for retrofitting collaborative components into an existing software application, which when executed, comprises: program code for receiving an executable object corresponding to the existing software application; program code for analyzing the existing software application to identify points for introducing the collaborative components; program code for defining a set of executable code to introduce the collaborative components at the identified points, wherein the set of executable code specifies when the collaborative components will be invoked and captures information used by the collaborative components from the existing software application; program code for building the set of executable code; and program code for linking the set of executable code and the collaborative components to the executable object.

A fourth aspect of the present invention provides a method for deploying an application for retrofitting collaborative components into an existing software application, comprising: providing a computer infrastructure being operable to: receive an executable object corresponding to the existing software application; analyze the existing software application to identify points for introducing the collaborative components; define a set of executable code to introduce the collaborative components at the identified points, wherein the set of executable code specifies when the collaborative components will be invoked and captures information used by the collaborative components from the existing software application; build the set of executable code; and link the set of executable code and the collaborative components to the executable object.

A fifth aspect of the present invention provides computer software embodied in a propagated signal for retrofitting collaborative components into an existing software application, the computer software comprising instructions to cause a computer system to perform the following functions: receive an executable object corresponding to the existing software application; analyze the existing software application to identify points for introducing the collaborative components; define a set of executable code to introduce the collaborative components at the identified points, wherein the set of executable code specifies when the collaborative components will be invoked and captures information used by the collaborative components from the existing software application; build the set of executable code; and link the set of executable code and the collaborative components to the executable object.

Therefore, the present invention provides a method system and program product for retrofitting collaborative components into an existing software application.

BRIEF DESCRIPTION OF THE DRAWINGS

These and other features of this invention will be more readily understood from the following detailed description of the various Aspects of the invention taken in conjunction with the accompanying drawings in which:

FIG. 2 depicts an interface for an existing software application according to an illustrative example of the present invention.

Figure 1:
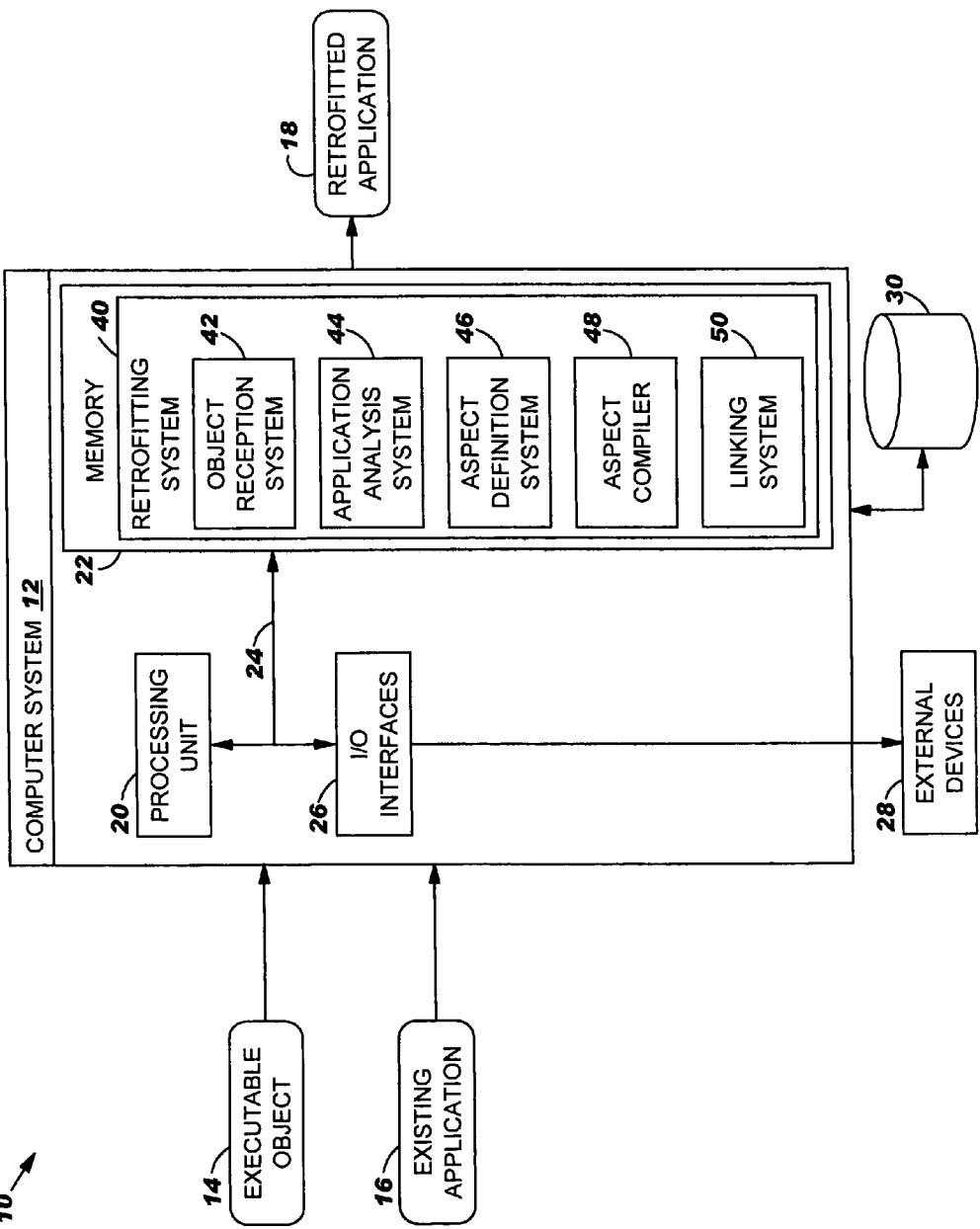
FIG. 1 depicts a system for retrofitting collaborative components into an existing software application according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

As indicated above, the present invention provides an aspect-oriented method system and program product for retrofitting collaborative components into an existing software application. Specifically, under the present invention, an executable object such as binary or JAVA byte code corresponding to the software application is obtained. Based on an analysis of the software application, points for introducing the collaborative components are identified. A set of executable code (e.g., an Aspect) to introduce the collaborative components at the identified points is then defined and built. Thereafter, the set of executable code and the collaborative components are linked to the executable object.

In a typical embodiment, the present invention is implemented using Aspect-Oriented Programming (AOP). Under AOP, "Aspects" are special objects that define rules for actions occurring before, after, and within code. While Object-Oriented Programming is a methodology for software modularization whereby specific pieces of application functionality are separated into objects, AOP extends this separation further, by effectively modularizing calls within objects that are being repeated across disparate objects into Aspects. A major benefit of this approach is a separation of secondary, supporting functionality (now expressed as Aspect objects) from the core objects of the application. The core code becomes simply focused on the core requirements. The rules in the Aspects automatically apply the secondary functionality at runtime.

In the case of retrofitting, the objects in the application being retrofitted represent core functionality, and the collaborative features being introduced would be represented by one or more Aspects. These "collaborative" Aspects contain rules indicating where to retrofit their capabilities into the application. AOP adds new language-agnostic concepts and has been implemented in many languages. Three concepts are relevant for retrofitting: defining and instancing Aspects, specifying rules, and integrating Aspects with existing code. Aspects are declared similarly to how classes are declared in the host programming language. A main distinction between Aspects and objects in object-oriented programming is the incorporation of rules, and how they are instanced. Aspects are generally not instantiated programmatically—they only appear when their rules are triggered at runtime. The rules that tie an Aspect to other objects in an application are defined by conditions, termed pointcuts, and actions, termed advice. From a retrofitting perspective, creating rules in Aspects is akin to monitoring for desired patterns of events from the targeted application.

Pointcuts actually refer to points or regions of program execution, which can be expressed as a variety of object operations, including private or public method calls, object instantiations, attribute assignments, scoping conditions, and program flows. Pointcuts can even refer to private calls and attributes, thus exposing the internal programming interfaces of the application. Thus, inner application semantics can be leveraged in addition to events passed between the application and the runtime environment. Pointcuts can also declare context to capture data from the associated pieces of program execution, such as parameters passed into methods and the calling object. Advice is associated with pointcuts, brings in context around pointcuts, and specifies when to apply actions when pointcuts are encountered. Advice is where collaborative features get established and invoked in the application.

Finally, there are two techniques utilized to introduce Aspects into an application. The first approach is to use an Aspect compiler that compiles the Aspect and generates hidden intermediate objects that express the Aspect in the original language of the application. The intermediate objects use reflection and event hooking to ensure that pointcuts are established with appropriate advice into the application, without recompiling the original code. The end result is a self-sufficient application whose code appears to be in the original language of the application. The second technique, known as "runtime weaving," is to use a special runtime that dynamically incorporates the Aspects with the targeted application during execution. These two options are examples of the flexible runtime configuration characteristic for retrofitting—depending on the application requirements; one approach may be more suitable than the other. In an illustrative example set forth below, an Aspect compiler is discussed. However, it should be understood that the technique of "runtime weaving" could be implemented hereunder as well.

It should be understood that a collaborative component can be retrofitted into an application in any known manner. For example, a collaborative component could be retrofitted using icons, tool tips, etc. denoting online status in a user interface associated with an application.

Referring now to FIG. 1, a system 10 for retrofitting collaborative components into an existing software application 16 (hereinafter application 16) is shown. In general, system 10 includes computer system 12, which is intended to represent any type of computerized device capable of caring out the present invention. For example, computer system 12 could be a desktop computer, a laptop computer, a workstation, a handheld device, a client, a server, etc. As shown, computer system 12 includes processing unit 20, memory 22, bus 24, input/output (I/O) interfaces 26, external devices/resources 28 and storage unit 30. Processing unit 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, a data object, etc. Moreover, similar to processing unit 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LED screen, hand-held device, keyboard, mouse, voice recognition system, speech output system, printer, monitor/display, facsimile, pager, etc. Bus 24 provides a communication link between each of the components in computer system 12 and likewise may comprise any known type of transmission link, including electrical, optical, wireless, etc.

Storage unit 30 can be any system (e.g., a database, etc.) capable of providing storage for information under the present invention. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Although not shown, additional components, such as cache memory, communication systems, system software, etc., may be incorporated into computer system 12.

It should be appreciated that the teachings of the present invention could be implemented via a stand-alone system as shown, or over a network such as the Internet, a local area network (LAN), a wide area network (WAN), a virtual private network (VPN), etc. In the case of the latter, communication throughout the network could occur via a direct hardwired connection (e.g., serial port), or via an addressable connection that may utilize any combination of wireline and/or wireless transmission methods. Conventional network connectivity, such as Token Ring, Ethernet, WiFi or other conventional communications standards could be used. Still yet, connectivity could be provided by conventional IP-based protocol. In this instance, an Internet service provider could be used to establish interconnectivity.

Shown in memory 22 of computer system 12 as a program product is retrofitting system 40, which includes object reception system 42, application analysis system 44, Aspect definition system 46, Aspect compiler 48 and linking system 50. Under the present invention, retrofitting system 40 is used to retrofit collaborative components into application 16. Specifically, retrofitting system 40 will allow collaborative components to be retrofitted into application 16 without affecting the source code thereof. To retrofit collaborative components into application 16 under the present invention, an executable object 14 corresponding thereto will be received (e.g., as provided by a programmer, administrator, etc.) by object reception system 42. In a typical embodiment, the executable object 14 is the binary of application 16, JAVA byte code for application 16, etc. Regardless, application analysis system 44 will then analyze application 16 to identify points for introducing/retrofitting the collaborative component(s). For example, an address book interface of application 16 might make a good point to introduce a collaborative component to indicate an on-line status of the address book contacts. Application 16 can be analyzed for such points in any number of ways. For example, source code for application 16 could be inspected by application analysis system 44. Alternatively, application analysis system 44 could include (or work in conjunction) with a tracer, a profiler and/or a decompiler through which application 16 is passed/run to identify the points.

Regardless, once the points for introducing collaborative component(s) are identified, an Aspect to introduce the collaborative components will be defined by Aspect definition system 46. The Aspect is typically a set of executable code (including rules) that can execute before, around or after the identified points. To this extent, the Aspect specifies which collaborative components will be invoked (e.g., on-line status, chat capabilities, etc.), as well as when the collaborative components will be invoked (e.g., after a specific event in application 16, etc.). In addition, the Aspect will capture information from application 16 used by the collaborative components (e.g., a user name). For example, assume that the desired collaborative component deals with the on-line status of other users identified in an address book. In this case, the Aspect can be defined so that when the address book feature is launched within application 16, the on-line status of the contacts therein is obtained. As such, the Aspect can be defined so that the user of application 16 is prompted to log on to another application such as an instant messaging service that the contacts may use (or the user can be automatically logged on if his/her log on information is stored). Once the user has logged on to the other program, the Aspect would retrieve the on-line status of the contacts appearing in the address book. Once the Aspect has been defined as desired, Aspect compiler 48 will actually build the Aspect, and linking system 50 will link the same with the executable object 14 (e.g., the binary) previously received by object reception system 42 and the collaborative components. In performing the linking operation, linking system 50 can "weave" the set of executable code (e.g., the Aspect) into the binary 14. In any event, the result will be retrofitted application 18.

ILLUSTRATIVE EXAMPLE

Figure 3:
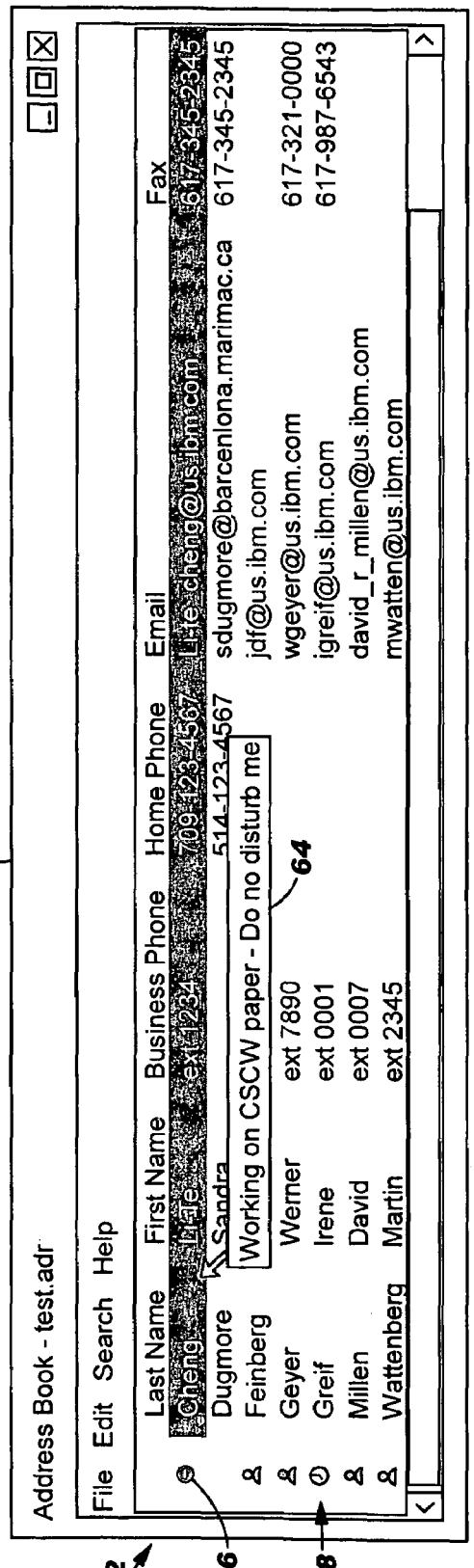
FIG. 3 depicts the interface of FIG. 2 showing retrofitted collaborative components according to the present invention.

With reference to FIGS. 2 and 3, an Aspect-based technique of introducing/retrofitting collaborative features into an application will be discussed. In this example, the existing software application is a single-user application that lets the user enter contact information, save and load all contact data, and conduct searches. An illustrative screenshot (e.g., a table interface 60) is shown in FIG. 2. As can be seen, table interface 60 includes rows 62 of contact entries. It is often the case that the operability of an address book could benefit from awareness information provided by an instant messaging service. Under the present invention, table interface 60 would be modified to include icons and the like denoting online status such as online, away, and do not disturb. An illustrative example of this is depicted in FIG. 3. As can be seen, icons 68 can be provided adjacent rows 62 to indicate on-line status. Moreover, a tooltip 64 or the like can be displayed when row is selected or a pointer device is moved thereover. The tool tip 64 can contain specific status information such as an away message as shown.

As indicated above, this retrofitting is accomplished without having to recompile the original application. Rather, under the present invention such retrofitting requires only one Aspect that interacts with an instant messaging service (e.g., Lotus a registered trademark of International Business Machines Corp. in the U.S. and elsewhere, Sametime instant messaging toolkit, which is commercially available from International Business Machines, a registered Trademark of International Business Machines Corp. of Armonk, N.Y. in the U.S. and elsewhere). The strategy used to accomplish the retrofit was threefold. First, an understanding of the application from its runtime behavior and its code base is obtained, looking for useful internal application programming interfaces. Second, the pointcut is identified and advice defined where the new collaborative feature(s) can be initialized upon application startup. Third, to identify the pointcut and define advice where a foothold into the user interface can be established and added to.

In this illustrative example, assume that the address book is represented by an AddressBook class, which includes an open( ) method that is called when the application is starting up, and returns an SWT Shell object (the widget for the entire application window). Also, assume the address book uses a Table widget consisting of TableItem widgets for each row. Each TableItem contains the fields for one contact, which are set up using a setText( ) method. The key field is the email address which can be used as an identifier to obtain online status information from the instant messaging service.

Further assume that there unused methods to set icons and tooltips in the table interface 60. In this example, AspectJ was used, which provides extensions to Java for AOP, to define an Aspect representing instant messaging awareness information associated with a row entry in table interface 60 of the address book. Shown below is the Aspect that was created, with the internals written in pseudo-code for brevity:

```
public Aspect LiveName
{
    after( ) returning(Shell shell):
        call(* AddressBook.open(..))              SECTION A
    {
            // Display login dialog in shell      SECTION B
            // Login to IM System
            // Add listener for IM status changes, update icons
    }
    after(TableItem item) :
        (target(item) &&                          SECTION C
        call(* TableItem.setText(..)))
    {
            // Get email from table item          SECTION D
            // Get current IM status using email
            // Get icon based on IM status
            // Add listener for mouse hover, show IM status text
            // Add icon to table item
    }
}
```

In the above code, certain lines are marked as Sections A-D. Sections A and C define the pointcuts of interest, while Sections B and D define advice corresponding to the pointcuts in the associated sections.

Section A defines a pointcut on any call to the open( ) method of the AddressBook class. This captures the moment when the application is starting up. This is an important moment to allow a setup related to our new collaborative feature. Section B defines the advice using section A's pointcut. The "after" keyword specifies that the advice's actions will execute after the pointcut is completed (i.e., after the open( ) method returns with something). The "returning(Shell shell)" piece allows the advice to capture the return value from the call to the open( ) method. The returned shell widget gives a parent widget in which to pop up a login dialog when the advice is triggered. After obtaining the login information from the dialog, the instant messaging service is logged into, and a listener is set up for status changes. As status changes occur, the listener updates the icon in the appropriate row of the table using a hashtable that maps email addresses to rows.

Section C defines a pointcut on any call to the setText( ) method of the TableItem widget. This specifies the moment when a row with contact information is being created or changed. This is an important moment to set up an awareness icon in the table, and establish tooltip information. The "target(item)" piece of the pointcut captures the actual TableItem widget instance calling the setText( ) method and associates it with the "item" parameter. Section D defines the advice using Section C's pointcut. Again, the "after" keyword specifies the actions for this advice that are invoked after the setText( ) method is completed. The "item" parameter from the pointcut is passed through to the advice. The code in the advice extracts the email field from "item," which is then used to query the instant messaging system for status information. The status information is then mapped to appropriate tooltip and icon information to display in the table ("item" allows us to access the appropriate methods). The hashtable used in section B is updated with a mapping between the email address and the table row.

The new Aspect was then compiled, and linked in the instant messaging library and the binary for the address book application. The final result was an application that operates largely the same as before, but with a new feature. Change or rebuilding of the original application code was not needed. This example is not intended to be limiting and could be expanded (e.g., more could be specified in the Aspect). For example, the existing context menu could be extended with an option to start a chat conversation from a name. Structurally, instead of concentrating all of the new functionality in the Aspect code, regular non-Aspect classes could be defined encapsulating the awareness functionality, and advice actions to calls to these classes could be reduced. This way, the Aspect is focused on bridging the address book application's objects and the objects associated with the new features.

It should be appreciated that the present invention could be offered as a business method on a subscription or fee basis. For example, computer system 12 and/or retrofitting system 40 could be created, supported, maintained and/or deployed by a service provider that offers the functions described herein for customers. That is, a service provider could offer to retrofit collaborative components into existing software applications for client or customers.

It should also be understood that the present invention could be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for retrofitting collaborative components into an existing software application, comprising:
   receiving an executable object corresponding to the existing software application;
   analyzing the existing software application to identify points for introducing the collaborative components;
   defining a set of executable code to introduce the collaborative components at the identified points, wherein the set of executable code specifies when the collaborative components will be invoked and captures information used by the collaborative components from the existing software application;
   building the set of executable code; and
   linking the set of executable code and the collaborative components to the executable object, wherein the linking includes
      compiling the executable object,
      generating hidden intermediate executable objects that express the executable object in a language of the existing software application, and
      reflecting and event hooking to ensure that points are established with the appropriate set of executable code to introduce the collaborative components at the identified points, without recompiling the original software application.

2. The method of claim 1, wherein the analyzing step comprises inspecting source code of the existing software application.

3. The method of claim 1, wherein the analyzing step comprises running the existing software application through a tracer.

4. The method of claim 1, wherein the analyzing step comprises running the existing software application through a decompiler.

5. the method of claim 1, wherein the analyzing step comprises running the existing software application through a profiler.

6. The method of claim 1, wherein the set of executable code comprises an Aspect, and wherein building step comprises building the Aspect using an Aspect Compiler.

7. The method of claim 1, wherein the executable object is selected from the group consisting of binary and byte code.

8. A system for retrofitting collaborative components into an existing software application, comprising: a computer device;
   means for receiving an executable object corresponding to the existing software application;
   means for analyzing the existing software application to identify points for introducing the collaborative components;
   means for defining a set of executable code to introduce the collaborative components at the identified points, wherein the set of executable code specifies when the collaborative components will be invoked and captures information used by the collaborative components from the existing software application;
   means for building the set of executable code; and
   means for linking the set of executable code and the collaborative components to the executable object, wherein the means for linking includes
      means for compiling the executable object,
      means for generating hidden intermediate executable objects that express the executable object in a language of the existing software application, and
      means for reflecting and event hooking to ensure that points are established with the appropriate set of executable code to introduce the collaborative components at the identified points, without recompiling the original software application.

9. The system of claim 8, wherein the means for analyzing inspects source code of the existing software application.

10. The system of claim 8, wherein the means for analyzing runs the existing software application through a tracer.

11. The system of claim 8, wherein the means for analyzing runs the existing software application through a decompiler.

12. The system of claim 8, wherein the means for analyzing runs the existing software application through a profiler.

13. The system of claim 8, wherein the set of executable code comprises an Aspect, and wherein building step comprises building the Aspect using an Aspect Compiler.

14. The system of claim 8, wherein the executable object is selected from the group consisting of binary and byte code.

15. A program product stored on a recordable medium for retrofitting collaborative components into an existing software application, which when executed, comprises:
   program code for receiving an executable object corresponding to the existing software application;
   program code for analyzing the existing software application to identify points for introducing the collaborative components;
   program code for defining a set of executable code to introduce the collaborative components at the identified points, wherein the set of executable code specifies when the collaborative components will be invoked and captures information used by the collaborative components from the existing software application;
   program code for building the set of executable code; and
   program code for linking the set of executable code and the collaborative components to the executable object, wherein the program code for linking includes
      program code for compiling the executable object,
      program code for generating hidden intermediate executable objects that express the executable object in a language of the existing software application, and
      program code for reflecting and event hooking to ensure that points are established with the appropriate set of executable code to introduce the collaborative components at the identified points, without recompiling the original software application.

16. The program product of claim 15, wherein the program code for analyzing inspects source code of the existing software application.

17. The program product of claim 15, wherein the program code for analyzing runs the existing software application through a tracer.

18. The program product of claim 15, wherein the program code for analyzing runs the existing software application through a decompiler.

19. The program product of claim 15, wherein the program code for analyzing runs the existing software application through a profiler.

20. The program product of claim 15, wherein the set of executable code comprises an Aspect, and wherein building step comprises building the Aspect using an Aspect Compiler.

21. The program product of claim 15, wherein the executable object is selected from the group consisting of binary and byte code.

22. A method for deploying an application for retrofitting collaborative components into an existing software application, comprising:
   providing a computer infrastructure being operable to:
      receive an executable object corresponding to the existing software application;
      analyze the existing software application to identify points for introducing the collaborative components;
      define a set of executable code to introduce the collaborative components at the identified points, wherein the set of executable code specifies when the collaborative components will be invoked and captures information used by the collaborative components from the existing software application,
         wherein the captured information comprises one of the group of data and parameters;
      build the set of executable code; and
      link the set of executable code and the collaborative components to the executable object, wherein the linking includes
         compiling the executable object,
         generating hidden intermediate executable objects that express the executable object in a language of the existing software application, and
         reflecting and event hooking to ensure that points are established with the appropriate set of executable code to introduce the collaborative components at the identified points, without recompiling the original software application.

23. A system for retrofitting collaborative components into an existing software application, the system comprising: a computer device;
   means for receiving an executable object corresponding to the existing software application;
   means for analyzing the existing software application to identify points for introducing the collaborative components, wherein the means for analyzing inspects source code of the existing software application;
   means for defining a set of executable code to introduce the collaborative components at the identified points, wherein the set of executable code specifies when the collaborative components will be invoked and captures information used by the collaborative components from the existing software application, and wherein the executable code comprises an Aspect;
   means for building the set of executable code, wherein the building step comprises building the Aspect using an Aspect Compiler; and
   means for linking the set of executable code and the collaborative components to the executable object, wherein the means for linking includes
      means for compiling the executable object,
      means for generating hidden intermediate executable objects that express the executable object in a language of the existing software application, and
      means for reflecting and event hooking to ensure that points are established with the appropriate set of executable code to introduce the collaborative components at the identified points, without recompiling the original software application.

* * * * *